Aug. 5, 1958 W. M. COSTELLO 2,846,644
COMBINATION FLASHLIGHT AND CIRCUIT TESTER
Filed Dec. 24, 1956
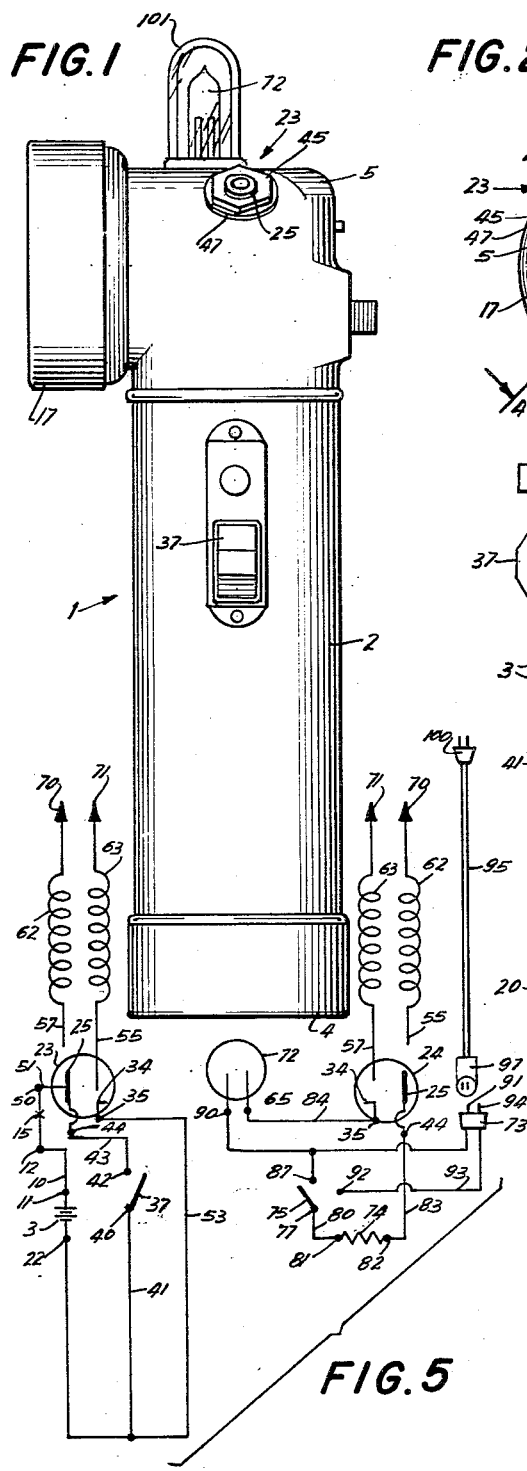
FIG.1
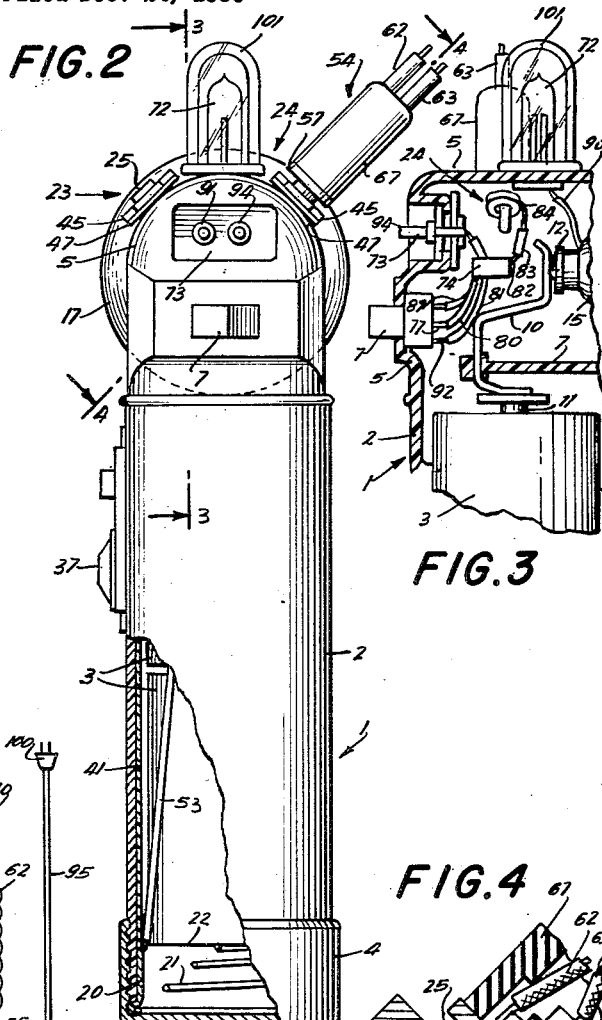
FIG.2
FIG.3
FIG.4
FIG.5
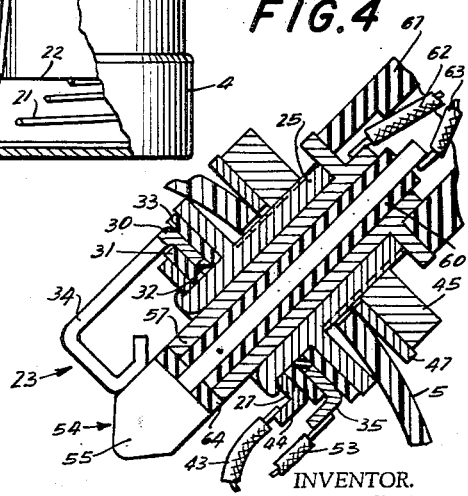
INVENTOR.
WILLIAM M. COSTELLO
BY Henry J. E. Metzler
ATTORNEY United States Patent Office 2,846,644
Patented Aug. 5, 1958

2,846,644

COMBINATION FLASHLIGHT AND CIRCUIT TESTER

William M. Costello, New York, N. Y.

Application December 24, 1956, Serial No. 630,186

3 Claims. (Cl. 324—53)

The present invention relates to improvements in electric hand lamps; particularly to a portable lamp having a casing containing a light bulb and a source of electric energy and bearing a switch to enable the bulb to be energized or extinguished by operation of the switch to close or open the circuit.

An important object of the invention is to provide an electric lamp of the flashlight variety, preferably of angular formation, having the usual design to serve for illuminating purposes; and further equipped with plug-in contact socket terminals to adapt the lamp for testing other circuits and separate electrical appliances of numerous kinds.

In its preferred form the invention comprises a simple and inexpensive attachment or addition to an otherwise conventional flashlight arranged so as to render the lamp useful as a circuit tester or continuity tester, with its battery supplying current, and its incandescent lamp acting as a current indicator, with no loss or impairment of its capacity for illumination.

The hitherto known combination flashlight and circuit testers could not be used for testing non-energized or "dead" electric circuits, the resistance of which is so large that it cannot be checked by means of flashlight batteries, so that the usefulness of those testers was limited to low-resistance circuits or to energized electric circuits. Therefore, another important object of the present invention is the provision of a device of the character described which allows also alternatingly the use of an external source of current for testing a non-energized circuit of one hundred and ten or more volts, so that my new and improved device can be used for the following purposes: Firstly as an ordinary flashlight; secondly for testing whether or not an electrical appliance or a part thereof is energized; thirdly for testing the continuity of a non-energized electric circuit with the flashlight battery supplying the test current; and, fourthly for testing the continuity of a non-energized electric circuit the resistance of which is so high that it cannot be tested with a flashlight battery, and for the testing of which an external source of current, for instance current taken from a wall socket or the like, has to be used.

A further object of the present invention is the provision of a device of the character described which—although it can be used for all the four purposes mentioned, and which thus replaces at least four separate single-purpose devices—does not require any appreciable increase in the size and/or the weight of an ordinary flashlight, and which is simple and easy to operate.

Yet still another object of the present invention is the provision of a device of the character described which requires only slight changes in the parts of an ordinary flashlight and allows most of the standard flashlight parts to be used without any changes, thus greatly reducing the cost of tooling up and of storing parts for the making of these devices.

A still further object of the present invention is the provision of a device of the character described which is sturdy, durable, reliable and safe in operation as well as of a pleasing outer appearance, and which also is well adapted for withstanding the rough usage to which devices of this type frequently are subjected.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

In said drawing:

Figure 1 is a side elevation of a preferred embodiment of my invention;

Fig. 2 is a rear elevation of the same;

Fig. 3 is a fractional sectional view on the line 3—3 of Fig. 2;

Fig. 4 is an enlarged, fractional sectional view on the line 4—4 of Fig. 2; and, Fig. 5 is a wiring diagram.

Similar reference characters refer to similar parts throughout the several views.

In the drawing the numeral 1 denotes a casing which preferably is made of non-conductive plastic material, or of hard rubber, or of any other suitable insulating material. The casing 1 has a tubular main portion 2, adapted for containing one or more batteries 3, as well as a removable bottom closure cap 4, and a top portion 5. The top portion 5 preferably is right-angular, as shown, although it can also be straight or of any other desired formation. An intermediate wall 7 (Fig. 3) preferably is provided between the main portion 2 and the upper portion 5, and an angular resilient contact member 10 is secured to the wall 7. The member 10 forms a conductive connection between a battery terminal 11 and a terminal 12 of an electric light bulb 15, which is mounted in an insulating member 17 attached to the portion 5 of the casing 1. A conductive bushing 20 is provided at the inner side of the lower end section of the main portion 2 of the housing 1, and a conductive spring 21 is interposed between the bottom terminal 22 of the lowest one of the batteries 3 and the cap 4 as well as the bushing 20.

A pair of plug-in sockets 23 and 24 are extended into and secured to the top portion 5 of the casing 1. Each of the plug-in sockets 23 and 24 has a conductive tubular member 25 to which is attached a first conductive ring member 27, as may be seen in detail in Fig. 4. A second conductive ring member 30 is insulated from the members 25 and 27 by means of insulating annular members 31, 32 and 33, and has a resilient contact portion 34 as well as a prong 35. The members 25 preferably are externally threaded, and a nut 45 is screwed upon that portion of each member 25 which protrudes beyond the outer side of the portion 5 of the casing 1. A washer 47 preferably is interposed between each nut 45 and the portion 5 of the casing 1. An ordinary flashlight switch 37 is mounted on the main portion 2 of the casing 1 and has a terminal 40 (Fig. 5) connected to the conductive bushing 20 by means of a conductive member 41. Another terminal 42 of the switch 37 is connected by means of an insulated wire 43 to a prong 44 of the member 27, which is conductively connected to the member 25 of the socket 23. Another terminal 50 (Fig. 5) of the light bulb 15 also is electrically connected to the member 25 by means of a conductive member 51. The prong 35 of the conductive member 30, which has the resilient contact portion 34, is connected by means of an insulated wire 53 to the conductive bushing 20 and thus to the terminal 22 of the battery 3 as well as to the terminal 40 of the switch 37. A plug 54 (Figs. 2 and 4), which has conductive contact elements 55 and 57 that are insulated from each other by means of insulating elements 60 and 61 (Fig. 4), can be inserted into each one of the sockets 23 or 24, and insulated wires 62 and 63 are extended through an insulating handle member 67 and connected to the conductive elements 55 and 57 respectively by means of soldering or the like. Thus the above described elements, the interconnections of which are indicated in the left-hand portion of the wiring diagram of Fig. 5, can be utilized as follows: firstly, as an ordinary flashlight, the light bulb 15 of which can be switched on or off by manipulation of the switch 37; thereby the plug 54 preferably is removed from the socket 23. Secondly, for testing the continuity of a dead or non-energized electrical circuit by inserting the plug 54 into the socket 23, opening the switch 37, and touching with the ends 70 and 71, the terminals (not shown) of an electrical circuit to be tested. If said circuit is interrupted, the light bulb 15 will not light up; if it is uninterrupted an electric current will flow from the terminal 11 of the battery 3 over the bulb 15, the members 51, 25, 57, 62, 70 through the continuous circuit which is to be tested, the members 71, 63, 55, 34 and 53, to the terminal 22 of the battery 3, so that the light bulb 15 will light up, thus indicating the continuity of the circuit to be tested.

Referring now to the right-hand portion of the wiring diagram of Fig. 5, the numeral 72 denotes a test neon tube or lamp, the numeral 73 denotes a two terminal plug, the numeral 74 denotes a resistor, and the numeral 75 denotes a changeover switch. The parts 72, 73 and 75 are extended into the portion 5 of the casing 1 through openings provided therein, and the resistor 74 is mounted within said portion 5.

The switch 75 has a main terminal 77 which is connected by means of an insulated conductor 80 with a first terminal 81 of the resistor 74. A second terminal 82 of the resistor 74 is connected by means of an insulated conductor 83 to a prong 44 of a conductor member 25 of the socket 24, which also has a resilient contact portion 34 and a prong 35 that is connected by means of an insulated conductor 84 to a terminal 85 of the neon lamp 72. A contact terminal 87 of the switch 75 is conductively connected to a second terminal 90 of the neon lamp 72 and to a first plug terminal 91 of the terminal plug 73. Another contact terminal 92 of the switch 75 is connected by means of an insulated conductor 93 to a second plug terminal 94 of the terminal plug 73. The terminal plug 73 can be connected to any suitable source of current, preferably to a 110 or 220 volt wall socket (not shown) by means of a cable 95 (Fig. 5), which at one end has a plug-in socket 97, adapted to engage the plug 73, and at its other end has a plug 100 adapted for being plugged into said wall socket or into any other suitable source of current. Thus, in addition to the two purposes described above my new and improved combination flashlight and circuit tester, by means of the combination of parts indicated by the right-hand portion of the wiring diagram of Fig. 5, can be utilized; thirdly, for testing whether or not an electrical appliance, element, or the like is energized; and fourthly for testing the continuity of a non-energized electric circuit the resistance of which is so high that it cannot be tested with a flashlight battery, and for the testing of which an external source of current, for instance current taken from a wall socket or the like, has to be used. For testing whether or not an appliance or the like is energized, the switch 75 is moved into a position in which the terminal 77 is directly connected to the terminal 87, the plug 54 is inserted into the socket 24, and the terminals 70 and 71 are brought into close, conductive contact with the terminals (not shown) of the appliance or the like to be tested. If the appliance to be tested is energized, an electric current will flow from the terminal 70, through the elements 62, 55, 25, 83, 74, 80, 75, 87, 72, 84, 35, 34, 57 and 63 to the terminal 71, so that the lamp 72 will light up. In order to test the continuity of an electric circuit the resistance of which is too high to be tested by means of a flashlight battery, the switch 75 is moved into a direction in which the terminal 77 is directly connected to the terminal 92, the plug 54 is inserted into the socket 24, and the terminals 70 and 71 are brought into close, conductive contact with the terminals (not shown) of the appliance to be tested. Moreover, the socket 97 is brought into engagement with the terminal plug 73, and the plug 100 is inserted into a wall socket or the like. Then the electrical test current supplied by said wall socket or the like flows from the plug 91 through the elements 90, 72, 85, 84, 35, 34, 57, 63, 71, the appliance or the like to be tested, the elements 70, 62, 55, 25, 83, 74, 75, 92, 93, to the plug 94, thereby the lamp 72 lighting up if the circuit to be tested is continuous.

A transparent protective cover member 101 preferably is secured to a section of the portion 5 encompassing the lamp 72.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. The combination with a flashlight having a control switch, a casing, a flashlight light bulb and flashlight batteries within said casing, of three plug-in sockets mounted on said casing, a test neon tube mounted on said casing having a first terminal conductively connected to a first terminal of the first one of said plug-in sockets while its second terminal is conductively connected to a first terminal of the second one of said plug-in sockets, a change-over switch mounted on said casing and having three terminals the first one of which is conductively connected to a second terminal of said second plug-in socket while the second terminal of said change-over switch is conductively connected to the first terminal of said second plug-in socket as well as to a second terminal of said neon tube, a resistor within said casing having a first terminal conductively connected to a third terminal of said change-over switch and having a second terminal conductively connected to a second terminal of said first plug-in socket, a third plug-in socket mounted on said casing having a first terminal conductively connected to a first terminal of said flashlight light bulb as well as to a first terminal of said flashlight control switch and having a second terminal conductively connected to a second terminal of said control switch as well as to a first terminal of the flashlight battery, whose second terminal is conductively connected to a second terminal of said flashlight light bulb, said change-over switch being adapted for alternatingly conductively connecting its third terminal with its first terminal or with its second terminal, said first and said third plug-in sockets being adapted for having their terminals detachably conductively connected to terminals of an electric circuit to be tested, and said second plug-in contact being adapted for having its terminals detachably and conductively connected to the terminals of a source of current outside of the flashlight.

2. A combination flashlight and circuit tester comprising a casing, a first light bulb mounted on said casing, a control switch for said bulb mounted on said casing, a source of current contained in said casing, a first plug-in socket mounted on said casing, a second light bulb mounted on, and insulated from, said casing having a first terminal conductively connected to a first terminal of said first plug-in socket, a double terminal plug mounted on said casing having a first terminal connected to a first terminal of said second light bulb, a change-over switch mounted on said casing and having three terminals the first one of which is conductively connected to a second terminal of said double terminal plug while the second terminal of said change-over switch is conductively connected to the first terminal of said double terminal plug as well as to a second terminal of said second light bulb, a resistor within said casing having a first terminal conductively connected to a third terminal of said change-over switch and having a second terminal conductively connected to a second terminal of said first plug-in socket, a second plug-in socket mounted on said casing having a first terminal conductively connected to a first terminal of said first light bulb as well as to a first terminal of said control switch and having a second terminal conductively connected to a second terminal of said control switch as well as to a first terminal of the source of current whose second terminal is conductively connected to a second terminal of said first light bulb, means for conductively and detachably connecting both terminals of said double terminal plug to a source of current outside of said casing, and means for conductively and detachably connecting either one of said plug-in contacts to terminals of an electric circuit which is to be tested, said change-over switch being adapted for alternatingly conductively connecting its third terminal with its first terminal or with its second terminal.

3. The combination with a flashlight having a control switch, a casing, a flashlight light bulb and flashlight batteries within said casing, of two separate circuit testers mounted on said casing, one of said testers consisting of a first contact member conductively connected to a terminal of said flashlight light bulb and to a first terminal of said control switch, and a second contact member conductively connected to a second terminal of said control switch as well as to a terminal of a flashlight battery within the casing; the other one of said circuit testers consisting of a three-terminal change-over switch, a resistor having a first terminal conductively connected to a first terminal of said change-over switch, a detachable connection extending to a source of current outside of said casing having a first terminal conductively connected to a second terminal of said change-over switch, a testing lamp having a first terminal conductively connected to a second terminal of said detachable connection as well as to a third terminal of said change-over switch, a third contact member conductively connected to a second terminal of said testing lamp, and a fourth contact member conductively connected to a second terminal of said resistor; and means for conductively and detachably connecting either one of said contact members to terminals of an electric circuit which is to be tested.

References Cited in the file of this patent
UNITED STATES PATENTS
2,564,166   Marinello _____ Aug. 14, 1951